(12) United States Patent
Mody et al.

(10) Patent No.: US 12,641,189 B2
(45) Date of Patent: May 26, 2026

(54) DYNAMIC CONFIGURATION OF PERSPECTIVE TRANSFORMATION ENGINE

(71) Applicant: Texas Instruments Incorporated, Dallas, TX (US)

(72) Inventors: Mihir Narendra Mody, Bengaluru (IN); Brijesh Jadav, Bengaluru (IN); Gang Hua, Katy, TX (US); Niraj Nandan, Plano, TX (US); Rajasekhar Reddy Allu, Plano, TX (US); Ankur Ankur, New Delhi (IN); Mayank Mangla, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 132 days.

(21) Appl. No.: 18/599,324

(22) Filed: Mar. 8, 2024

(65) Prior Publication Data

US 2024/0214511 A1 Jun. 27, 2024

Related U.S. Application Data

(63) Continuation of application No. 17/690,829, filed on Mar. 9, 2022.

(51) Int. Cl.
| | |
|---|---|
| *H04N 5/262* | (2006.01) |
| *G06T 3/40* | (2024.01) |
| *G06T 7/12* | (2017.01) |
| *G06T 7/60* | (2017.01) |
| *G06T 11/00* | (2026.01) |

(52) U.S. Cl.
CPC ............. *H04N 5/2628* (2013.01); *G06T 3/40* (2013.01); *G06T 7/12* (2017.01); *G06T 7/60* (2013.01); *G06T 11/00* (2013.01)

(58) Field of Classification Search
CPC ........... H04N 5/2628; G06T 3/40; G06T 7/12; G06T 7/60; G06T 11/00; G06T 3/00; G06T 11/60
See application file for complete search history.

(56) References Cited

U.S. PATENT DOCUMENTS

| | | | |
|---|---|---|---|
| 8,228,396 B2 | 7/2012 | Hagiwara | |
| 2006/0126944 A1* | 6/2006 | Loui ................... | G06F 16/5838 |
| | | | 382/224 |
| 2007/0065043 A1 | 3/2007 | Sano | |
| 2014/0009568 A1 | 1/2014 | Stec et al. | |
| 2014/0125773 A1* | 5/2014 | Maki ........................ | G06T 7/97 |
| | | | 348/47 |
| 2015/0379666 A1 | 12/2015 | Redzic et al. | |

(Continued)

*Primary Examiner* — Albert H Cutler
(74) *Attorney, Agent, or Firm* — Michelle F. Murray; Frank D. Cimino

(57) ABSTRACT

A technique for determining regions and block sizes for configuring a perspective transformation engine including determining a set of scale ratios for images captured by a camera, generating a scale ratio image based on the set of scale ratios, determining a set of boundary ranges for the scale ratio image, generating a binary scale ratio image using the set of scale ratios of the scale ratio image, determining a set of regions based on the set of boundary ranges for the binary scale ratio image, determining a block size for each region of the determined set of regions, and outputting the determined set of regions and the determined block sizes.

20 Claims, 6 Drawing Sheets

(56) References Cited

U.S. PATENT DOCUMENTS

| | | | |
|---|---|---|---|
| 2018/0150943 | A1 | 5/2018 | Gur et al. |
| 2019/0096042 | A1 | 3/2019 | Allu et al. |
| 2021/0042890 | A1 | 2/2021 | Naidu et al. |

* cited by examiner

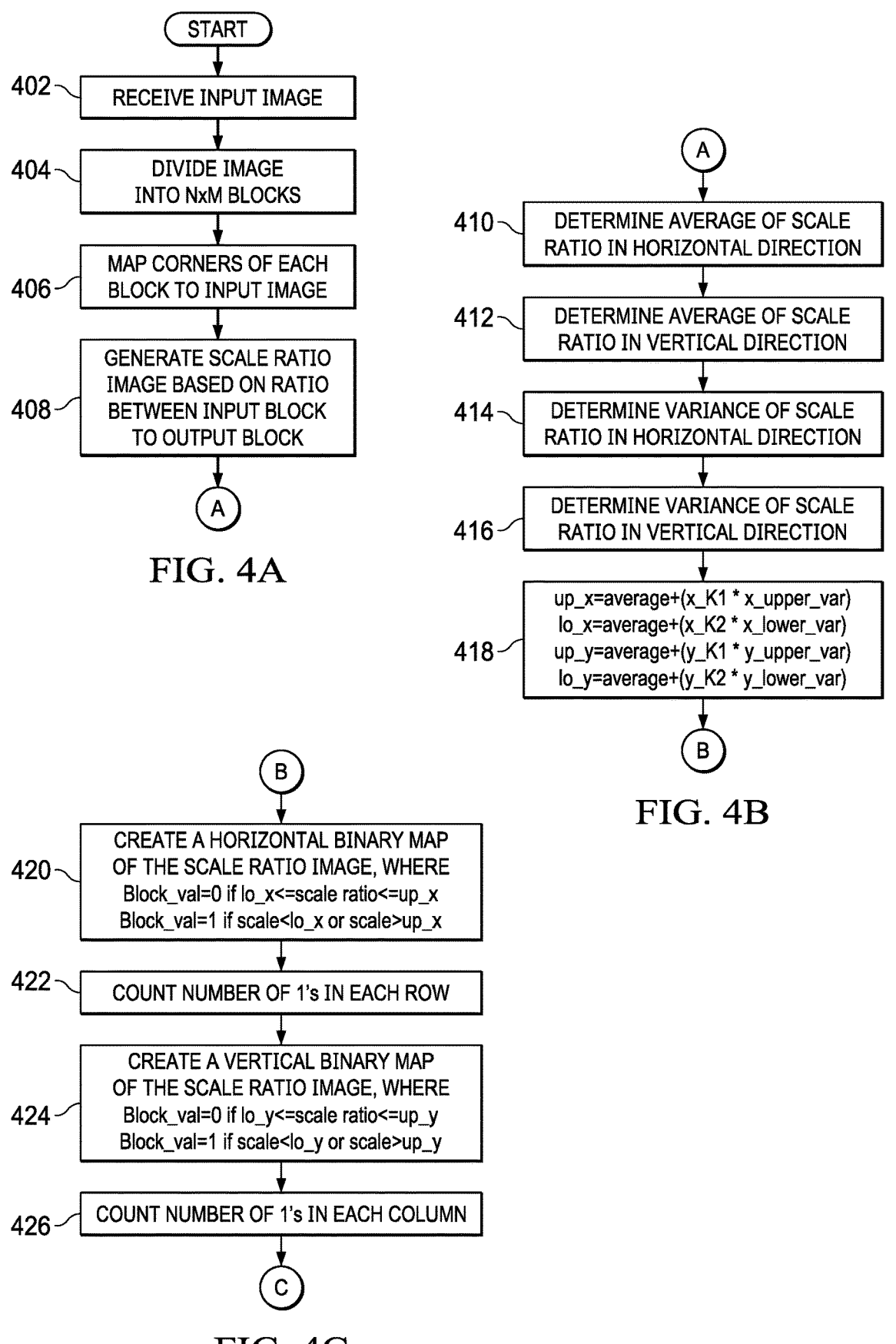

START

402 — RECEIVE INPUT IMAGE

404 — DIVIDE IMAGE INTO NxM BLOCKS

406 — MAP CORNERS OF EACH BLOCK TO INPUT IMAGE

408 — GENERATE SCALE RATIO IMAGE BASED ON RATIO BETWEEN INPUT BLOCK TO OUTPUT BLOCK

410 — DETERMINE AVERAGE OF SCALE RATIO IN HORIZONTAL DIRECTION

412 — DETERMINE AVERAGE OF SCALE RATIO IN VERTICAL DIRECTION

414 — DETERMINE VARIANCE OF SCALE RATIO IN HORIZONTAL DIRECTION

416 — DETERMINE VARIANCE OF SCALE RATIO IN VERTICAL DIRECTION

418 —
up_x=average+(x_K1 * x_upper_var)
lo_x=average+(x_K2 * x_lower_var)
up_y=average+(y_K1 * y_upper_var)
lo_y=average+(y_K2 * y_lower_var)

420 —
CREATE A HORIZONTAL BINARY MAP OF THE SCALE RATIO IMAGE, WHERE
Block_val=0 if lo_x<=scale ratio<=up_x
Block_val=1 if scale<lo_x or scale>up_x 422 — COUNT NUMBER OF 1's IN EACH ROW 424 —
CREATE A VERTICAL BINARY MAP OF THE SCALE RATIO IMAGE, WHERE
Block_val=0 if lo_y<=scale ratio<=up_y
Block_val=1 if scale<lo_y or scale>up_y 426 — COUNT NUMBER OF 1's IN EACH COLUMN

428 — SPLIT FRAME IN HORIZONTAL DIRECTION AT THE MAXIMUM 1's (PEAK 1 AND PEAK 2)

430 — SPLIT FRAME IN VERTICAL DIRECTION AT THE MAXIMUM 1's (PEAK 1 AND PEAK 2)

432 — REGION i=0

434 — CALCULATE MAX 2D SCALE RATIO IN REGION i

436 — BLOCK SIZE=INTERNAL MEMORY/MAX 2D SCALE RATIO

438 — BLOCK WIDTH=INTERFACE SIZE*N BLOCK HEIGHT= BLOCK SIZE/BLOCK WIDTH

440 — MOVE i TO NEXT REGION

442 — IS THIS LAST REGION ? NO / YES

END

DYNAMIC CONFIGURATION OF PERSPECTIVE TRANSFORMATION ENGINE

CROSS REFERENCE TO RELATED APPLICATIONS

This application is a continuation of and claims priority to U.S. patent application Ser. No. 17/690,829, filed Mar. 9, 2022, which is hereby incorporated herein by reference in its entirety.

BACKGROUND

Increasingly, vehicles, such as cars, airplanes, robots, etc., are being equipped with multiple external cameras to provide to the operator of the vehicle external views of the area surrounding the vehicle. These external views are commonly used to help maneuver the vehicle, such as when backing up or parking a car. Multiple camera views may be stitched together to form an external surround view around the vehicle. Generating these multi-camera views involves the use of multiple cameras, and processing images from these multiple cameras may involve a substantial amount of available computing power. Techniques for increasing an efficiency for processing images may be useful.

SUMMARY

Aspects of this disclosure relate to a technique for determining regions and block sizes for configuring a perspective transformation engine. The technique including determining a set of scale ratios for images captured by a camera. The technique also includes generating a scale ratio image based on the set of scale ratios. The technique further includes determining a set of boundary ranges for the scale ratio image. The technique also includes generating a binary scale ratio image using the set of scale ratios of the scale ratio image. The technique further includes determining a set of regions based on the set of boundary ranges for the binary scale ratio image. The technique also includes determining a block size for each region of the determined set of regions, and outputting the determined set of regions and the determined block sizes.

Another aspect of the present disclosure relates to a non-transitory program storage device comprising instructions stored thereon to cause one or more processors to determine a set of scale ratios for images captured by a camera. The instructions further cause the one or more processors to generate a scale ratio image based on the set of scale ratios. The instructions also cause the one or more processors to determine a set of boundary ranges for the scale ratio image. The instructions further cause the one or more processors to generate a binary scale ratio image using the set of scale ratios of the scale ratio image. The instructions also cause the one or more processors to determine a set of regions based on the set of boundary ranges for the binary scale ratio image. The instructions further cause the one or more processors to determine a block size for each region of the determined set of regions and output the determined set of regions and the determined block sizes.

Another as aspect of the present disclosure relates to a device including a camera configured to capture image data. The device also includes a perspective transformation engine configured to receive image data from the camera. The device further includes a processor configured to execute instructions to cause the first processor to determine a set of scale ratios for images captured by the camera. The instructions also cause the one or more processors to generate a scale ratio image based on the set of scale ratios. The instructions further cause the one or more processors to determine a set of boundary ranges for the scale ratio image. The instructions also cause the one or more processors to generate a binary scale ratio image using the set of scale ratios of the scale ratio image. The instructions further cause the one or more processors to determine a set of regions based on the set of boundary ranges for the binary scale ratio image. The instructions also cause the one or more processors to determine a block size for each region of the determined set of regions and output the determined set of regions and the determined block sizes to configure the perspective transformation engine.

BRIEF DESCRIPTION OF THE DRAWINGS

For a detailed description of various examples, reference will now be made to the accompanying drawings in which:

FIG. 4A is a flow diagram illustrating a technique for generating a scale ratio image, in accordance with aspects of the present disclosure.

FIG. 4B is a flowchart illustrating an example technique for determining a set of boundary ranges, in accordance with aspects of the present disclosure.

FIG. 4C is a flowchart illustrating an example technique for generating a binary scale ratio image, in accordance with aspects of the present disclosure.

The same reference number is used in the drawings for the same or similar (either by function and/or structure) features.

DETAILED DESCRIPTION

Often, the cameras used on vehicles to produce an external view include lenses, such as fisheye or wide-angle lenses, which produce distorted images but can allow for a wider field of view as compared to other lenses with less distortion. As an example, a vehicle may use a single 180 degree fisheye lens to cover an entire side of the vehicle. FIG. 1A illustrates an example distorted image 100, in accordance with aspects of the present disclosure. Of note, while described in conjunction with fisheye or wide-angle lenses, it may be understood that techniques addressed in this disclosure may be adapted for other types of lenses which may induce distortion, for example, magnifying, or barrel distortion lenses. As a part of generating the external views, the distorted images from the cameras may be corrected via image processing techniques. Distorted image 100 may be captured by a camera on a side of a vehicle 102A and a first target 104A and a second target 106A may be visible in the distorted image 100.

Figure 1B:
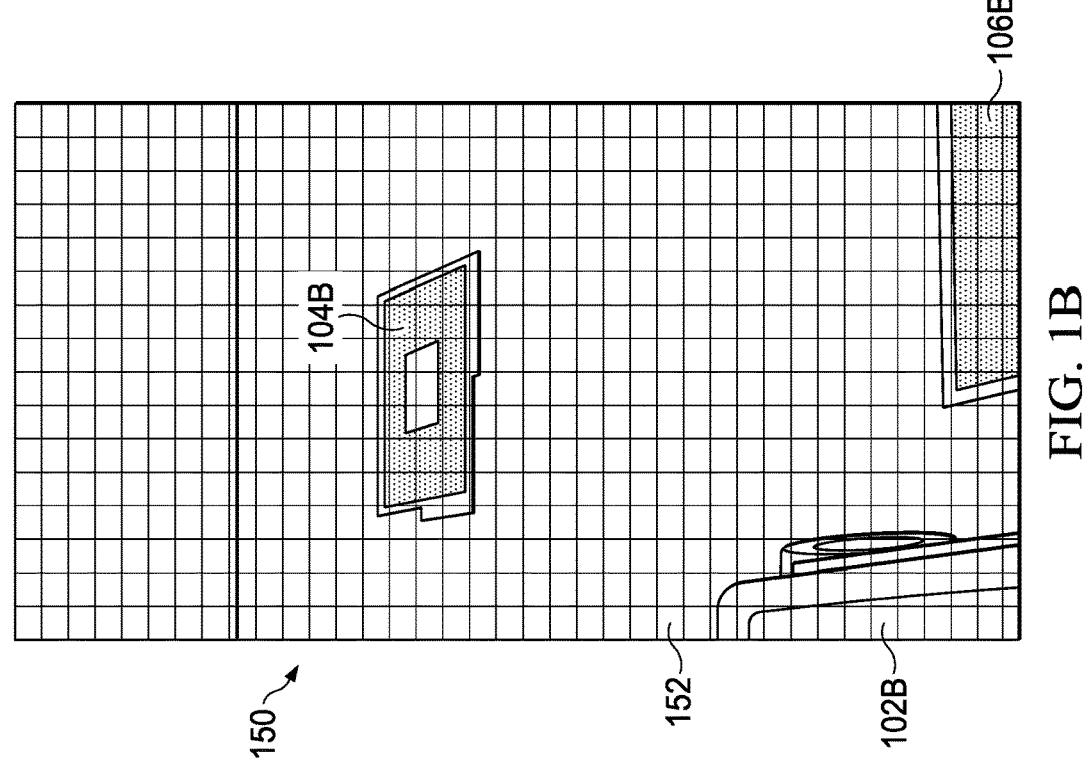
FIG. 1B illustrates a corrected image, in accordance with aspects of the present disclosure.
Figure 1A:
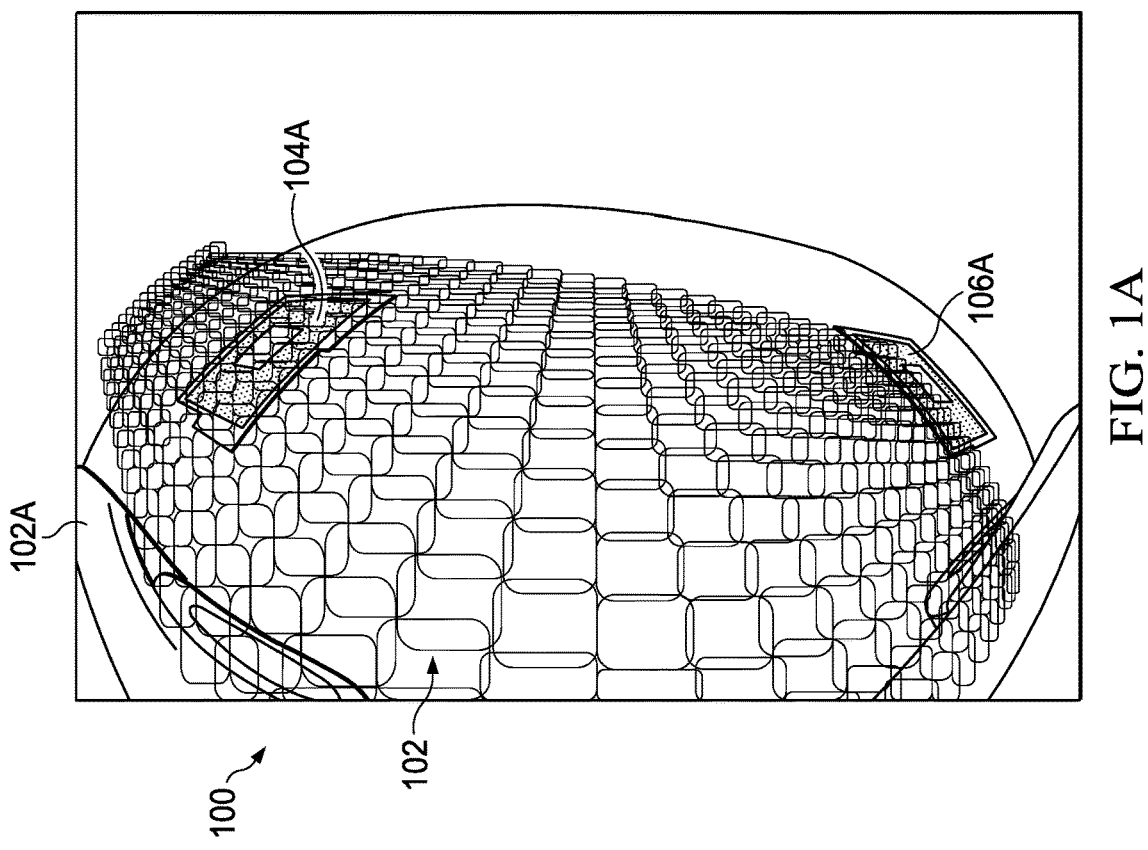
FIG. 1A illustrates a distorted image, in accordance with aspects of the present disclosure.

FIG. 1B illustrates an example corrected image 150, in accordance with aspects of the present disclosure. The corrected image 150 may be generated from the distorted image using image processing techniques such as a perspective or affine transformation and the side of the vehicle 102B, first target 104B and second target 104B are visible in the corrected image 150. In this example, in the corrected image 150, the viewpoint of the image has been adjusted such that the corrected image appears to be taken from a higher viewpoint, the lens distortion has been corrected, and the visible area cropped as compared to the distorted image 100. The image processing techniques may include a perspective (or affine) transformation, which may be used to correct distortion, alter the perspective of the viewpoint, project multiple images onto a common image plane, etc.

In some cases, the perspective transformation may be performed by one or more processors coupled to the cameras. For example, the cameras may be coupled to an image signal processor (ISP), digital signal processor (DSP), a system on a chip (SOC), application specific integrated circuit (ASIC), field programmable gate array (FPGA), etc. The cameras may capture an image that may be input (e.g., input image) to the perspective transformation hardware. The processors may include hardware dedicated to performing the perspective transformation, such as a perspective transformation engine, lens distortion engine, geometric correction engine, warp engine, etc. In some cases, the hardware to perform the perspective transformation may be configured to perform the perspective transformation on two dimensional (2D) portions of the images referred to as blocks. In some cases, a size of a block may be defined based on a characteristic of the image that is output (e.g., output image) from the perspective transformation process. For example, block size of the input image (e.g., image that the perspective transformation is to be performed on) may be defined based on an output block size for the output image (e.g., image with the perspective transformation applied). For example, correction image 150 includes grid lines showing edges of the output blocks 152 of corrected image 150. Each output block 152 of the corrected image 150 can be mapped back to an input block 102 of the distorted image 100. Additionally, in some examples, the sizes of the input blocks 102 vary based on a scale ratio, and the scale ratio may vary for each output block 152. This scale ratio indicates a relationship between the size of the input block and the size of the corresponding output block and the scale ratio may be based on an amount of distortion in the distorted image 100 at the location of the input block. For example, an amount of distortion for an image captured using a wide-angle lens may increase further away from the center of the distorted image 100. Thus, the scale ratio may change (e.g., get larger) for pixels (or groups of pixels) the further away from the center of the distorted image 100. Correspondingly, output block 152 sizes may get smaller the further away from the center of the distorted image 100. For example, image data of the distorted image 100 may be enlarged more (e.g., based on the relatively larger scale ratio) in a block further away from the center of the distorted image, resulting in a smaller output block 152. In some cases, this enlargement may also result in portions of the image to be included in multiple input blocks 102.

In some cases, image data representing the distorted image 100 and the corrected image 150 may be stored in an external memory. Examples of external memory may include double data rate (DDR) memory, dynamic random access memory (DRAM), flash memory, etc. The external memory may be on a separate integrated circuit (IC) as the processor performing the perspective transformation. Portions of the image data for the distorted image 100 may be read from the external memory and copied into an internal memory for processing by the perspective transformation hardware (e.g., processor). The internal memory may be a memory that is on the same IC as the processor performing the perspective transformation. Examples of the internal memory may include static random access memory (SRAM), registers, etc.

Generally, a size of the output block may be determined based on an amount of data which may be input into the perspective transformation hardware at a given point (e.g., memory throughput) and the amount of the available internal memory. For example, the size of the output blocks may be such that the image data for the corresponding input block fits in the internal memory of the perspective transformation hardware. However, as the size of the input block can vary for a given size of the output block, (e.g., where the blocks have different scale ratios), a size for the output block may be chosen based on the worst case (e.g., largest) input block so that image data for the largest input block will fit in the internal memory. However, selecting an output block size in such a manner may be sub-optimal in terms of hardware resource utilization as the internal memory may not be filled for other input block sizes aside from the largest input block. Additionally, while discussed in the context of a size of the internal memory, other factors may influence the size of the output block, including an amount of available memory bandwidth, design of the perspective transformation hardware, amount of available resources such as power, cooling capacity, etc.

Figures 2, 6:
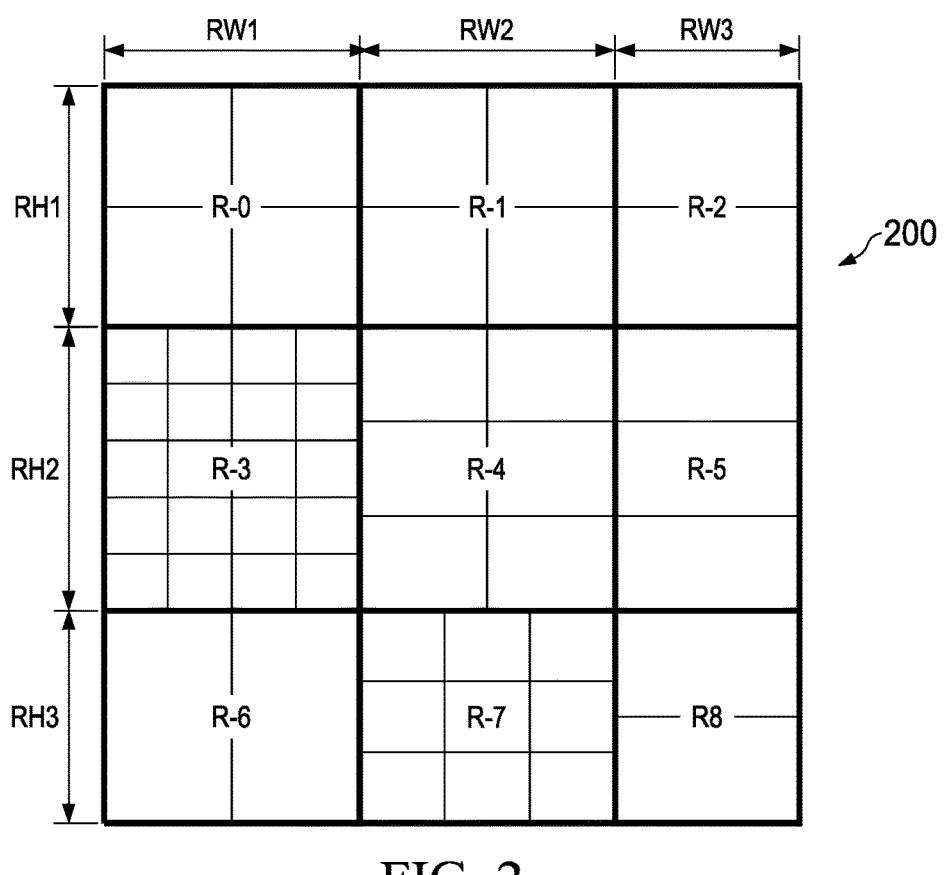
FIG. 2 illustrates an example corrected image divided into multiple regions, in accordance with aspects of the present disclosure.
FIG. 6 is a block diagram of a vehicle capable of generating an image, in accordance with aspects of the present disclosure.

To help improve the use of the hardware resources available to the perspective transformation hardware, in some cases, a perspective transformation may be performed on the distorted image 100 to generate the corrected image 150 based on multiple regions where the regions may have different output block sizes selected for the regions. FIG. 2 illustrates an example corrected image 200 divided into multiple regions, in accordance with aspects of the present disclosure. As shown, the corrected image 200 is divided into 9 regions, R-0 through R-8. In some cases, the regions may have different sizes such that two regions of a set of regions for an image may have different region heights and/or region widths. For example, regions R-0, R-1, and R-2 of corrected image 200 all have the same row height, RH1, but regions R-0, R-1, and R-2 have different row widths of RW1, RW2, and RW3 respectively. Similarly, regions R-1, R-4, and R-7 all have the same row width, RW2, but regions R-1, R-4, and R-7 have different row heights of RH1, RH2, and RH3, respectively.

In some cases, different output block sizes can be used in each region. For example, regions R-3 and R-4 may be similarly sized (e.g., both with a row height of RH2 and where RW1 and RW2 are relatively close in size), but R-3 may include more output blocks, here 20, which are smaller in size as compared to the 6 output blocks of region R-4. Having multiple regions with different output block sizes helps tailor the different output block sizes to corresponding input block sizes appropriate for the hardware resources.

Appropriate selection of the output block sizes allows the above described perspective transformation executes efficiently on a particular perspective transformation hardware. In many cases, selection of the output block sizes may be predetermined. For example, during a development process, the perspective transformation hardware may be modeled (e.g., simulated, such as on a desktop computer) executing a perspective transformation algorithm on representative distorted images using various region sizes and block size. Different combinations of region sizes and block sizes may be simulated exhaustively while monitoring resource utilization of the modeled perspective transformation hardware to identify a set of region sizes and block sizes that minimizes perspective transformation hardware resource usage. While predetermination of region and block sizing can help optimize the hardware resource usage for a particular perspective transformation, this predetermined region and block sizing is generally limited to a perspective transformation to be applied from a fixed perspective (e.g., view point), with a specific lens distortion, and with a specific amount of correction to be applied. Additionally, selecting region and block sizes based on exhaustive search techniques may be too resource intensive to be applied outside of a development process. A technique for dynamic configuration of a perspective transformation engine is described herein for selecting regions and block sizes for performing perspective transforms.

Figure 3:
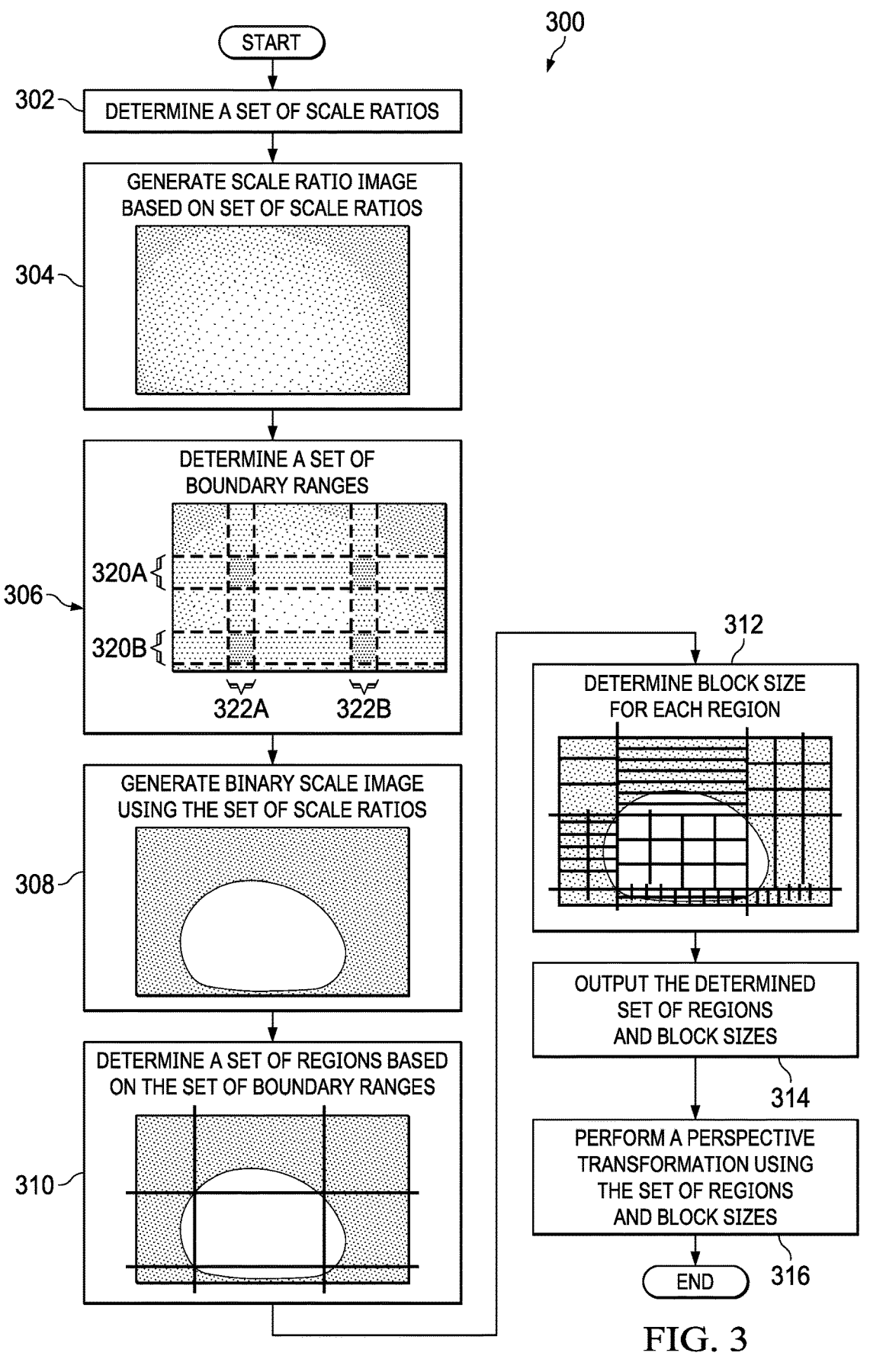
FIG. 3 is a flow diagram illustrating a technique for dynamic configuration of a perspective transformation engine, in accordance with aspects of the present disclosure.

FIG. 3 is a flow diagram 300 illustrating a technique for dynamic configuration of a perspective transformation engine, in accordance with aspects of the present disclosure. At step 302, a set of scale ratios for images captured by a camera is determined. As a part of performing a perspective transformation, a set of scale ratios may be defined based on an image received from a camera, such as a camera which captures distorted images. The scale ratio indicates how much a certain portion of the input image may be scaled (e.g., resized smaller or larger) to compensate for the distortion in that portion of the input image. Separate scale ratios may be defined for different portions of the input image for each dimension (e.g., horizontal and vertical axes). For example, the distortion in a given portion of the input image may be corrected by scaling by a certain ratio in the horizontal direction and another ratio in the vertical direction. Scale ratios may be defined for any grouping of pixels. For example, scale ratios may be defined on a per pixel basis, where each pixel may have multiple scale ratios (e.g., per axes), or scale ratios may be defined for a certain portion of the input image which includes multiple pixels.

In some cases, the scale ratios may be determined based on transformation information. The transformation information includes properties of the view and properties of the lens and describes the distortion of the camera and lens. Based on this transformation information, locations of pixels for an output image may be correlated with locations of corresponding pixels in an input image to determine scale ratios. The transformation information may be received as a part of configuring the camera for use with the perspective transformation engine. For example, the transformation information may be provided by a camera manufacturer or determined based on test images and stored. The stored transformation information may then be input as a part of performing the dynamic configuration.

A scale ratio image is generated based on the set of scale ratios at step 304. The scale ratio image may be an abstraction which places the scale ratios in a virtual image corresponding to the pixels to which the scale ratio applies. Step 304 includes a visualization of how a scale ratio image may be visualized with relatively larger scale ratios being shaded darker and relatively smaller scale ratios being shaded lighter. It should be understood that the scale ratio image may be an abstraction (e.g., a data-structure) and no actual image may be generated. In some cases, the input image may be down-sampled, and the scale ratios applied to the down-scaled image. For example, where the scale ratios are applied to a group of pixels (e.g., more than one), the input image may be down-scaled based on a number of pixels the scale ratios apply to as compared to images that would be actually captured by the input camera. In other cases, a down-sampling factor may be received and the scale ratio image may be down-sampled based on the down-sampling factor. In some cases, the scale ratio image may include a subset of the scale ratios. For example, down-sampling may be applied. As another example, less than the full visible portion of the captured image from a camera may be used in some cases, such for a viewpoint being displayed is different from an actual viewpoint of the camera. In such cases, the scale ratio image may be generated based on the viewpoint to be displayed.

A set of boundary ranges for the scale ratio image is determined at step 306. In some cases, two boundary ranges may be determined for each dimension. For example, two boundary ranges 320A and 320B may be determined for a horizontal axis and two boundary ranges 322A and 322B may be determined for the vertical axis. The boundary ranges help set limits within which the boundaries of the regions may be. The boundary ranges may be determined based on a variance of the scale ratios along a given dimension. For example, variances for scale ratio values along a given dimension may be determined and the boundary ranges may be selected based on the scale ratios associated with a relatively larger variance.

A binary scale ratio image of the scale image is generated using the set of scale ratios (e.g., from step 304) of the scale ratio image at step 308. The binary scale image may be a binarization of the scale ratio values. For example, the binary scale image may be generated by converting the scale ratios of the scale ratio image into binary values (e.g., 1 and 0) where scale ratios within a certain range of values are assigned a first binary value (e.g., 0), and where scale ratios outside that range of values are assigned a second binary value (e.g., 1). This range of values may be set, for example, based on a variance of the scale ratios, a mean scale ratio, mode scale ratio, a middle value of the range of scale ratios, etc.

A set of regions are determined based on the set of boundary ranges for the binary scale ratio image at step 310. For example, as discussed with respect to step 308, the binary scale image uses binary values, such as ones and zeros to represent the corresponding scale ratios. The number of ones (or zeros) in a column may be counted for columns within the boundary ranges (e.g., within boundary ranges 322A and 322B). Similarly, the number of ones (or zeros) in a row may be counted for rows within the boundary ranges (e.g., within boundary ranges 320A and 320B). The peaks (e.g., columns/rows with the largest number of ones (or zeros)) may be identified as region boundaries. In some cases, one boundary may be determined per boundary range. The set of regions may then be identified based on the identified region boundaries A block size for each region of the determined set of regions is determined at step 312. In some cases, the block size for each region may be determined as a function of a maximum scale ratio within the region and an amount of memory available to the perspective transformation engine. In some cases, the width for the block may be based on an interface size for the perspective transformation engine and the height for the block may be a function of the block size and the width for the block. The determined set of regions and determined block size may be output at step 314. For example, the determined set of regions and determined block size may be output to configure the perspective transformation engine. At step 316, a perspective transformation on an image may be performed using the set of regions and block size. For example, a perspective transformation engine may be configured using the set of regions and block size and an image input to the perspective transformation engine. The perspective transformation engine may perform a perspective transformation on the input image using the configured set of regions and block size.

Figure 4D:
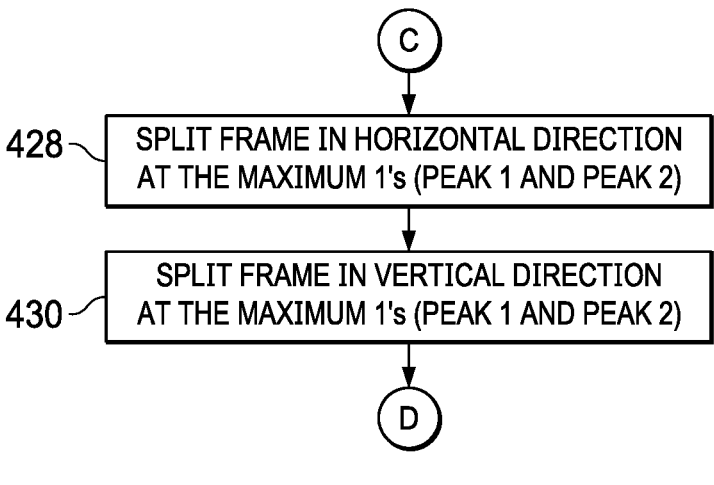
FIG. 4D is a flowchart illustrating an example technique for determining a set of regions, in accordance with aspects of the present disclosure.

FIGS. 4A-4E are flowcharts illustrating an example technique for dynamic configuration of a perspective transformation engine, in accordance with aspects of the present disclosure. FIG. 4A is a flowchart illustrating an example technique for generating a scale ratio image, in accordance with aspects of the present disclosure. At step 402 of FIG. 4A, an input frame is received. For example, a processor may receive a distorted input image (e.g., frame) captured by a camera. In some cases, the processor may receive many frames captured by the camera per second (e.g., 30, 60, or more frames per second). At block 404, the image is divided into N×M blocks. For example, the image may be divided into an 8×8 set of blocks. In some cases, the number of blocks may be configurable. Any number of blocks may be used and the number of blocks are only limited by the image resolution. At block 406, corners of the blocks are mapped to the input image. For example, the corners of the blocks may be mapped to coordinates (e.g., specific pixels) of the input image.

Transformation information may be received prior to block 408. The transformation information indicates how the input image may be transformed (e.g., how to map pixels from input image pixel coordinates to output image pixel coordinates) to the output image. The transformation information may include an indication of the perspective transformation to be determined, view properties, and lens properties. The perspective transformation may describe a positional shift between the perspective of the input image and the desired perspective of the output image. The view properties may include information describing the positional shift. For example, where an overhead view, relative to the vehicle, is being generated based on an image captured by a forward facing camera, the view properties may describe the shift in the viewpoint (e.g., perspective) from the forward facing viewpoint of the forward facing camera, to the viewpoint of a downward facing virtual camera positioned above the vehicle. The lens properties may include information describing the distortion produced by the lens and the lens properties may be predetermined, for example, by a manufacturer of the lens and/or camera and stored in a memory.

At block 408, a scale ratio image is generated based on a scale ratio between an input block and a corresponding output block. For example, the transformation information may be applied to pixels at the mapped corners of the blocks to determine locations of the corresponding pixels in the output image. Scale ratios for a block (e.g., per axis scale ratio) may be determined based on a difference between these locations and the mapped corners of the blocks. The scale ratios for the blocks may then be combined into the scale ratio image.

FIG. 4B is a flowchart illustrating an example technique for determining a set of boundary ranges, in accordance with aspects of the present disclosure. At step 410, an average scale ratio may be determined for scale ratios in rows of the scale ratio image by averaging the scale ratios in a row of the scale ratio image. At step 412, an average scale ratio may be determined for scale ratios in columns of the scale ratio image by averaging the scale ratios in a column of the scale ratio image. At step 414, a variance of the scale ratios may be determined for rows of the scale ratio image. For example, a variance indicating how much a particular scale ratio value differs from other scale ratio values in a row of scale ratio values for the scale ratio image may be determined. At step 416, a variance may be determined for columns of the scale ratio image. For example, a variance indicating how much a particular scale ratio value differs from other scale ratio values in a column of scale ratio values for the scale ratio image may be determined.

At step 418, boundary ranges may be determined for each dimension as a function of the average scale ratio and the variance. In this example, variables up_x and lo_x may be values for borders of a boundary range on a left or right part of the scale ratio image on the X dimension, and up_y and lo_y are values for borders of a boundary range on an upper or lower part of the scale ratio image on the Y dimension. In this example, a border for a first boundary range, such as up_x, in the X dimension may be determined by a function where an upper (or lower) variance value of the scale ratios in the X dimension (x_upper_var) is multiplied by a variable (x_K1), which corresponds to the boundary range being determined (e.g., upper or lower boundary range in the X dimension) and summed with the corresponding average scale ratio in the X dimension. Similarly, a first boundary range, such as up_y, in the Y dimension may be determined by a function where an upper (or lower) variance value of the scale ratios in the Y dimension (y_upper_var) is multiplied by a variable (y_K1), which corresponds to the boundary range being determined (e.g., upper or lower boundary range in the Y dimension) and summed with the corresponding average scale ratio in the Y dimension. These variables may represent upper and/or lower limits to the boundary range that may be based on properties of the camera and/or lens in use. That is, the scale ratio may change along a certain pattern on a dimension based on the shape of the lens and the boundary range may correspond to an area of the input image where the variance of the changing scale ratio is the largest. The variables may be implementation specific and may be provided, for example, by a user implementing a camera system.

FIG. 4C is a flowchart illustrating an example technique for generating a binary scale ratio image, in accordance with aspects of the present disclosure. At step 420, a horizontal binary map of the scale ratio image may be generated. In this example, block_val represent a binary value corresponding to a pixel (or set of pixels depending on the scale ratio, whether down-sampling is applied, etc.) of the scale ratio image. The block_val may be set to 0 if the scale ratio of the corresponding pixel (or set of pixels) is greater than (or equal to) lo_x or less than (or equal to) up_x. The block_val may be set to 1 if the scale ratio of the corresponding pixel (or set of pixels) is greater than lo_x or less than up_x. At step 422, the number of occurrences of a value, in this example ones, is determined for each row. At step 424, a vertical binary map of the scale ratio image may be generated. In this example, the block_val may be set to 0 if the scale ratio of the corresponding pixel (or set of pixels) is greater than (or equal to) lo_y or less than (or equal to) up_y. The block_val may be set to 1 if the scale ratio of the corresponding pixel (or set of pixels) is greater than lo_y or less than up_y. At step 426, a number of a value, in this example ones, is determined for each column.

FIG. 4D is a flowchart illustrating an example technique for determining a set of regions, in accordance with aspects of the present disclosure. At step 428, a row with a maximum number of the value (e.g., row with the most ones) within each boundary range on the horizontal axis is found and identified as a border of a region. At step 430, a column with a maximum number of the value (e.g., column with the most ones) within each boundary range on the vertical axis is found and identified as a boarder of a region. The regions are identified by these borders.

Figure 4E:
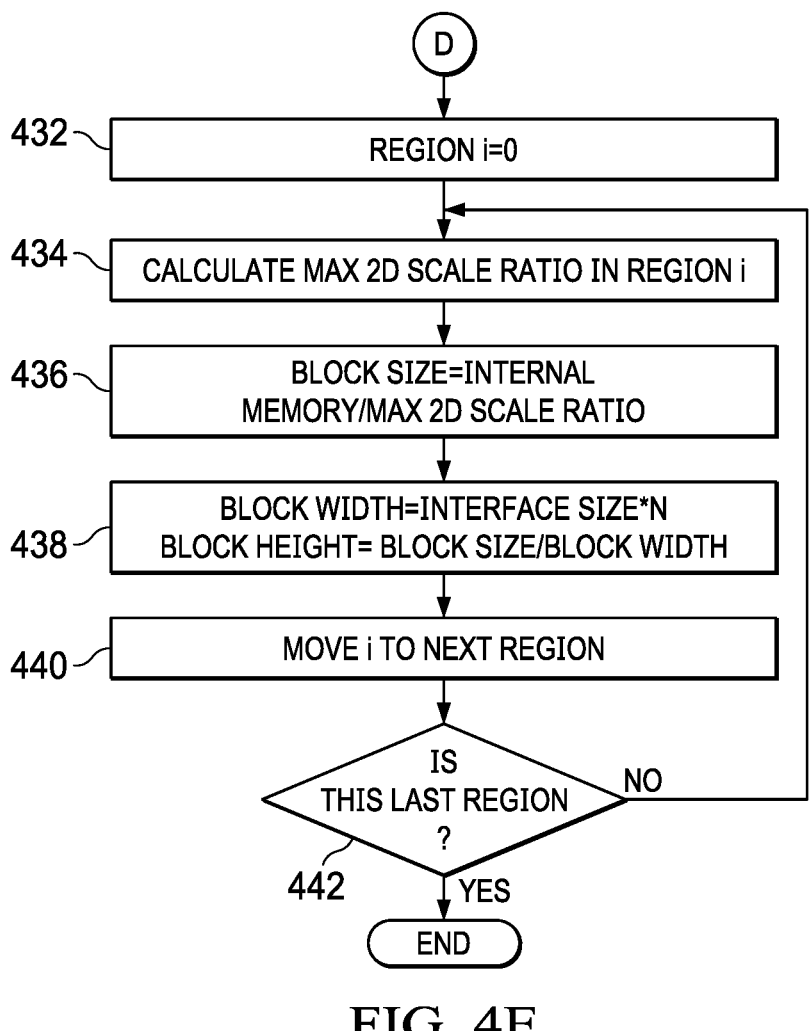
FIG. 4E is a flowchart illustrating an example technique for determining a block size for each region, in accordance with aspects of the present disclosure.

FIG. 4E is a flowchart illustrating an example technique for determining a block size for each region, in accordance with aspects of the present disclosure. At step 432, a first region is selected. At step 434, a maximum scale ratio value from the scale ratio values (e.g., generated in step 408) for the selected region is identified. At block 436, a block size (e.g., block area) is determined based on, for example, the amount of memory available to the perspective transformation engine divided by the maximum scale ratio. At block 438, a block width and a block height are determined. In this example, the block width is determined as a function of an interface size for the perspective transformation engine and/or a memory interface size. In this example, the interface size is multiplied by a variable N, which may be provided, for example, by a user implementing the camera system, and the variable helps allow tuning the block width. The block height is determined in the example as a function of the block size and the determined block width. At block 440, a next region is identified, and at block 442, if the current region is the last region, the operation stops, otherwise block sizes are determined for the other regions.

Figure 5:
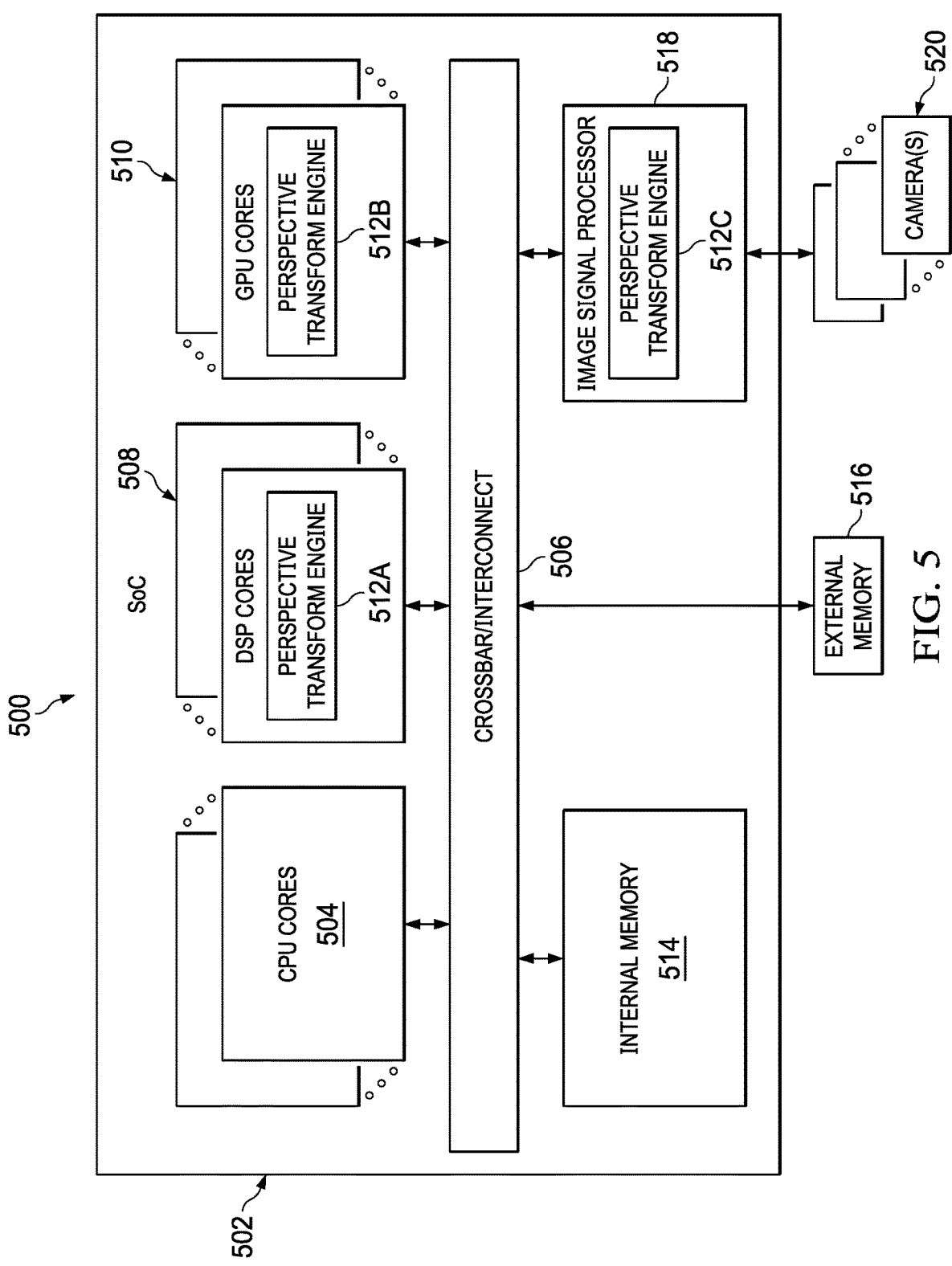
FIG. 5 is a block diagram illustrating a device for generating an image, in accordance with aspects of the present disclosure.

FIG. 5 is a block diagram illustrating a device 500 for generating an image, in accordance with aspects of the present disclosure. As shown, the device 500 may be system on a chip (SoC) 502. The SoC 502 may include multiple components integrated into a single IC. The multiple components of the SoC 502 may be configured to perform different tasks. As shown, the SoC 502 includes one or more central processing unit (CPU) cores 504. The CPU cores 504 may be configured for general computing tasks. For example, the CPU cores 504 may perform steps to dynamically configure a perspective transformation engine.

The SoC 502 may also include other processing cores such as DSP cores 508, GPU cores 510, and an image signal processor (ISP) 518. Of note, some SoCs may include DSP cores 508 and no GPU cores 510, while other SoCs may include GPU cores 510 and no DSP cores 508, and some SoCs may include neither DSP cores 508 nor GPU cores 510. As shown, any of the ISP 518, DSP cores 508 and GPU cores 510 may include a perspective transformation engine 512C, 512A, and 512B, respectively. Any of the perspective transformation engines 512A, 512B, and 512C may be dynamically configured using techniques discussed herein. The techniques for dynamically configuring the perspective transformation engines may be performed by any processing core, such as the CPU cores 504, DSP cores 508, GPU cores 510, ISP 518, etc. The techniques for dynamically configuring the perspective transformation engines may be performed by a processor by executing instructions stored on a non-transitory storage device. In some cases, the GPU core 510 may be faster at performing operations related to graphical rendering as compared to the DSP cores 508. However, the GPU core 510 may be omitted to help reduce cost and/or complexity, especially in cases where desired graphical renderings can be performed either by the DSP cores 508 or the CPU cores 504. The processing cores, including CPU cores 504, DSP cores 508, and GPU cores 510, may be interconnected via a crossbar (e.g., interconnect) 506, which interconnects and routes data between various components of the device. In some cases, the crossbar 506 may be a memory controller or any other circuit that can provide an interconnect between peripherals. Peripherals may include host peripherals (e.g., components that access memory, such as various processors, processor packages, direct memory access (DMA)/input output components, etc.) and target peripherals (e.g., memory components, such as double data rate (DDR) random access memory (RAM), other types of RAM, DMA/input output components, etc.). In this example, the crossbar 506 couples the peripherals including the processing cores, an internal memory 514, an external memory 516, and an image signal processor 518. The image signal processor 518 may be coupled to one or more cameras 520 and may receive images captured by the cameras 520. The image signal processor 518 may also process received images and may include a processing core (not shown).

In some cases, the internal memory 514 and/or external memory 516 may include one or more types of memory. In some cases, the internal memory 514 and/or external memory may include a non-transitory computer readable storage medium configured to store various types of data. For example, external memory 516 may include one or more volatile devices such as random access memory (RAM), registers, etc. Non-volatile storage devices can include one or more disk drives, optical drives, solid-state drives (SSDs), tap drives, flash memory, electrically erasable programmable read-only memory (EEPROM), and/or any other type memory designed to maintain data for a duration time after a power loss or shut down operation. The non-volatile storage devices may also be used to store programs that are loaded into the RAM when such programs executed.

FIG. 6 is a block diagram of a vehicle 600 capable of generating an image, in accordance with aspects of the present disclosure. The vehicle 600 includes a parking controller 602 and one or more cameras 604A-604D disposed around the vehicle 600. The one or more cameras 604A-604D are electronically coupled to the image controller 602 and capable of transmitting images to the image controller 602. The image controller 602 may include a processing device, such as a SoC. The SoC included in the image controller 602 may be a SoC such as SoC 502 of FIG. 5. The one or more cameras 604A-604D may be coupled to the image controller 602 over any vehicle network, such as a controller area network (CAN) bus, or wireless network. The one or more cameras 604A-604D may capture distorted images. In this example, the one or more cameras 604A-604D are disposed around the periphery of the vehicle 600, but it may be understood that the one or more cameras 604A-604D may be located anywhere on the vehicle 600.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. Circuits described herein are reconfigurable to include additional or different components to provide functionality at least partially similar to functionality available prior to the component replacement. Modifications are possible in the described embodiments, and other embodiments are possible, within the scope of the claims.

What is claimed is:

1. A method, comprising:
capturing, by a camera, an image that includes distortion; and
performing, by one or more processors, a perspective transformation on the image to correct the distortion, wherein performance of the perspective transformation comprises:
determining a set of scale ratios for the image;
determining a set of averages of the set of scale ratios for rows of the image;
determining a set of averages of the set of scale ratios for columns of the image;
determining a set of variances of the set of averages for the rows of the image;
determining a set of variances of the set of averages for the columns of the image;
determining a set of boundary ranges for the rows of the image based on the set of averages and the set of variances for the rows of the image; and
determining a set of boundary ranges for the columns of the image based on the set of averages and the set of variances for the columns of the image.

2. The method of claim 1, wherein performance of the perspective transformation further comprises:
determining a set of binary values for the rows of the image based on the set of scale ratios and the set of boundary ranges for the rows of the image; and
determining a set of binary values for the columns of the image based on the set of scale ratios and the set of boundary ranges for the columns of the image.

3. The method of claim 2, wherein performance of the perspective transformation further comprises:
determining a number of a first binary value for each row of the image based on the set of binary values for the rows of the image; and
determining a number of the first binary value for each column of the image based on the set of binary values for the columns of the image.

4. The method of claim 3, wherein performance of the perspective transformation further comprises:
determining a set of regions based on the numbers of the first binary value for the rows of the image and the numbers of the first binary value for the columns of the image.

5. The method of claim 4, wherein determining the set of regions comprises:
determining a set of rows with a maximum number of the first binary value within each boundary range for the rows of the image;

determining a set of rows with a maximum number of the first binary value within each boundary range for the columns of the image; and
determining the set of regions based on the set of rows with the maximum number and the set of columns with the maximum number.

6. The method of claim 4, wherein performance of the perspective transformation further comprises:
determining a block size for each region of the set of regions.

7. The method of claim 6, wherein determining the block size for each region comprises determining the block size based on a maximum scale ratio within the region and a size of a memory associated with a perspective transformation.

8. The method of claim 7, wherein performance of the perspective transformation further comprises:
determining a block width based on an interface size associated with the perspective transformation; and
determining a block height based on the block size and the block width.

9. The method of claim 6, wherein performance of the perspective transformation further comprises:
outputting the set of regions and the block sizes.

10. The method of claim 9, wherein performance of the perspective transformation further comprises:
performing a perspective transformation based on the set of regions and the block sizes.

11. A system, comprising:
a memory configured to store program instructions; and
a processor configured to perform a perspective transformation on an image to correct distortion of the image, wherein to perform the perspective transformation, the processor is configured to execute the program instructions to:
determine a set of scale ratios for the image captured by a camera;
determine a set of averages of the set of scale ratios for rows of the image;
determine a set of averages of the set of scale ratios for columns of the image;
determine a set of variances of the set of averages for the rows of the image;
determine a set of variances of the set of averages for the columns of the image;
determine a set of boundary ranges for the rows of the image based on the set of averages and the set of variances for the rows of the image; and
determine a set of boundary ranges for the columns of the image based on the set of averages and the set of variances for the columns of the image.

12. The system of claim 11, wherein the processor is configured to execute the program instructions to:
determine a set of binary values for the rows of the image based on the set of scale ratios and the set of boundary ranges for the rows of the image; and
determine a set of binary values for the columns of the image based on the set of scale ratios and the set of boundary ranges for the columns of the image.

13. The system of claim 12, wherein the processor is configured to execute the program instructions to:
determine a number of a first binary value for each row of the image based on the set of binary values for the rows of the image; and
determine a number of the first binary value for each column of the image based on the set of binary values for the columns of the image.

14. The system of claim 13, wherein the processor is configured to execute the program instructions to:

determine a set of regions based on the numbers of the first binary value for the rows of the image and the numbers of the first binary value for the columns of the image.

15. The system of claim 14, wherein to determine the set of regions comprises, the processor is configured to execute the program instructions to:

determine a set of rows with a maximum number of the first binary value within each boundary range for the rows of the image;

determine a set of rows with a maximum number of the first binary value within each boundary range for the columns of the image; and determine the set of regions based on the set of rows with the maximum number and the set of columns with the maximum number.

16. The system of claim 14, wherein the processor is configured to execute the program instructions to determine a block size for each region of the set of regions.

17. The system of claim 16, wherein to determine the block size for each region, the processor is configured to execute the program instructions to determine the block size based on a maximum scale ratio within the region and a size of a memory associated with a perspective transformation.

18. The system of claim 17, wherein the processor is configured to execute the program instructions to:

determine a block width based on an interface size associated with the perspective transformation; and determine a block height based on the block size and the block width.

19. The system of claim 16, wherein the processor is configured to execute the program instructions to:

output the set of regions and the block sizes.

20. The system of claim 19, wherein the processor is configured to execute the program instructions to:

cause performance of a perspective transformation based on the set of regions and the block sizes.

* * * * *